US011403470B2

United States Patent
Ishikawa

(10) Patent No.: US 11,403,470 B2
(45) Date of Patent: Aug. 2, 2022

(54) TRANSLATION DEVICE

(71) Applicant: Panasonic Intellectual Property Management Co., Ltd., Osaka (JP)

(72) Inventor: Tomokazu Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 249 days.

(21) Appl. No.: 16/599,156

(22) Filed: Oct. 11, 2019

(65) Prior Publication Data

US 2020/0042604 A1 Feb. 6, 2020

Related U.S. Application Data

(63) Continuation of application No. PCT/JP2018/015435, filed on Apr. 12, 2018.

(30) Foreign Application Priority Data

Apr. 27, 2017 (JP) .............................. JP2017-088605

(51) Int. Cl.
*G06F 40/58* (2020.01)
*G06F 40/242* (2020.01)
*G10L 13/08* (2013.01)

(52) U.S. Cl.
CPC ............ *G06F 40/58* (2020.01); *G06F 40/242* (2020.01); *G10L 13/086* (2013.01)

(58) Field of Classification Search
None
See application file for complete search history.

(56) References Cited

U.S. PATENT DOCUMENTS 7,783,472 B2 * 8/2010 Nagao ..................... G06F 40/58 704/2
8,452,603 B1 * 5/2013 Liu .......................... G06F 40/58 704/277

(Continued)

FOREIGN PATENT DOCUMENTS

JP 2008-225963 9/2008

OTHER PUBLICATIONS

International Search Report of PCT application No. PCT/JP2018/015435 dated Jul. 17, 2018.

(Continued)

*Primary Examiner* — Richemond Dorvil
*Assistant Examiner* — Rodrigo A Chavez
(74) *Attorney, Agent, or Firm* — McDermott Will & Emery LLP

(57) ABSTRACT

A storage unit stores a target term, a substitute term, a substitute translated term, and a representative term. The substitute translated term is a translation of the substitute term and is expressed in a second language. The representative term indicates a type of the target term and is expressed in the second language. A communication unit acquires a provisional translation that is a translation of a processed sentence from a first external device that has a translation function. When the storage unit does not store a target translated term that is a translation of the target term, a controller replaces the substitute translated term contained in the provisional translation with the representative term to generate a second display-purpose translated sentence, and then causes a display unit to display the second display-purpose translated sentence.

9 Claims, 11 Drawing Sheets

(56) References Cited

U.S. PATENT DOCUMENTS

| | | | | |
|---|---|---|---|---|
| 9,367,541 B1* | 6/2016 | Servan | .................. | G06F 40/295 |
| 2006/0217955 A1* | 9/2006 | Nagao | ..................... | G06F 40/58 |
| | | | | 704/2 |
| 2010/0082324 A1* | 4/2010 | Itagaki | .................... | G06F 40/47 |
| | | | | 704/2 |
| 2013/0262080 A1* | 10/2013 | Marciano | ................ | G06F 40/47 |
| | | | | 704/3 |
| 2019/0251175 A1* | 8/2019 | Deming, Jr. | ............ | G06F 40/45 |

OTHER PUBLICATIONS

The Extended European Search Report dated Apr. 6, 2020 for the related European Patent Application No. 18792061.6.

* cited by examiner

SUBSTITUTE WORD DICTIONARY

| CLASS | JAPANESE (T2) | ENGLISH | CHINESE |
|---|---|---|---|
| 商店 | パン屋 | bakery | 面包店 |
| 食べ物 | バナナ | banana | 香蕉 |
| ⋮ | ⋮ | ⋮ | ⋮ |

REPRESENTATIVE WORD DICTIONARY

| CLASS | ENGLISH | CHINESE |
|---|---|---|
| 商店 | shop | 这个商店 |
| 食べ物 | food | 这种食物 |
| ⋮ | ⋮ | ⋮ |

REPLACEMENT INFORMATION

| BEFORE REPLACEMENT | AFTER REPLACEMENT |
|---|---|
| スマイルセンター (T1) | パン屋 (T2) |

FIG. 12

35 PRIORITY TABLE

| PRIORITY ORDER \ TRANSLATION LANGUAGE | ENGLISH | CHINESE | THAI | ... |
|---|---|---|---|---|
| 1 | JAPANESE | ENGLISH | ENGLISH | ... |
| 2 | CHINESE | JAPANESE | LAOTIAN | ... |
| 3 | THAI | SPANISH | CHINESE | ... |
| ... | ... | ... | ... | ... |

FIG. 14

31
REGISTERED WORD DICTIONARY

| JAPANESE | ENGLISH | CHINESE | DISPLAY CLASS | TRANSLATION CLASS |
|---|---|---|---|---|
| スマイルセンター | Smile Center | N/A | SHOP | PLACE NAME |
| ......... | ......... | ......... | ......... | ......... |

TRANSLATION DEVICE

TECHNICAL FIELD

The present disclosure relates to a translation device that translates an input sentence from one language into another language.

BACKGROUND ART

PTL 1 discloses a machine translation device that, when an input phrase contains an unfamiliar word that it may be difficult to translate accurately, replaces this unfamiliar word with a substitute word that it is possible to translate accurately, and then translates the input phrase. This machine translation device replaces a translation of the substitute word in the resultant phrase with a translation of the unfamiliar word. In this way, the machine translation device appropriately translates the phrase even if a phrase contains an unfamiliar word.

CITATION LIST

Patent Literature

PTL 1: Unexamined Japanese Patent Publication No. 2008-225963

SUMMARY

The present disclosure provides a translation device that replaces a term in an original sentence (e.g., spoken sentence) in a first language with a substitute term, and outputs a translated sentence in a second language that is a translation of the original sentence. This translation device provides improved usability on the registration of the term to the translation device.

A translation device according to an aspect of the present disclosure acquires an original sentence expressed in a first language, and replaces a target term contained in the original sentence with a substitute term in the first language to generate a processed sentence. This translation device includes a storage unit, a communication unit, a display unit, and controller. The storage unit stores the target term, the substitute term, a substitute translated term, and a representative term. The substitute translated term is a translation of the substitute term and is expressed in a second language. The representative term indicates a type of the target term and is expressed in the second language. The communication unit outputs the processed sentence to a first external device and acquires a provisional translation from the first external device. The provisional translation is a translation of the processed sentence and is expressed in the second language. The first external device has a function of making translation from the first language into the second language. The controller controls the display unit. When the storage unit stores a target translated term that is a translation of the target term and is expressed in the second language, the controller replaces the substitute translated term contained in the provisional translation with the target translated term to generate a first display-purpose translated sentence, and then causes the display unit to display the first display-purpose translated sentence. When the storage unit does not store the target translated term, the controller replaces the substitute translated term contained in the provisional translation with the representative term to generate a second display-purpose translated sentence, and then causes the display unit to display the second display-purpose translated sentence.

The translation device replaces a term in an original sentence (e.g., spoken sentence) in a first language with a substitute term, and outputs a translated sentence in a second language that is a translation of the original sentence. According to the present disclosure, the translation device provides improved usability on the registration of the term to the translation device.

BRIEF DESCRIPTION OF DRAWINGS

FIG. 6 is a diagram of an example of a substitute word dictionary.

FIG. 7 is a diagram of an example of a representative word dictionary.

FIG. 8 is a diagram of an example of replacement information.

FIG. 12 is a diagram of an example of a priority table according to a second exemplary embodiment.

FIG. 14 is a diagram of an example of a registered word dictionary according to another exemplary embodiment.

DESCRIPTION OF EMBODIMENT

Some exemplary embodiments will be described below in detail with reference to the accompanying drawings as appropriate. In some instances, excessively detailed descriptions will be skipped. For example, a detailed description of known matters and a duplicate description of substantially identical configurations may be skipped. A reason for this is to avoid unnecessary redundancy of the following description and to facilitate understanding of those skilled in the art.

The inventor provides the accompanying drawings and the following description to help those skilled in the art to fully comprehend the present disclosure, but does not intend to limit subject matters recited in the claims with the drawings and the description.

First Exemplary Embodiment

With reference to FIGS. 1 to 11B, a first exemplary embodiment will be described below.

[1-1. Configuration]

Figure 1:
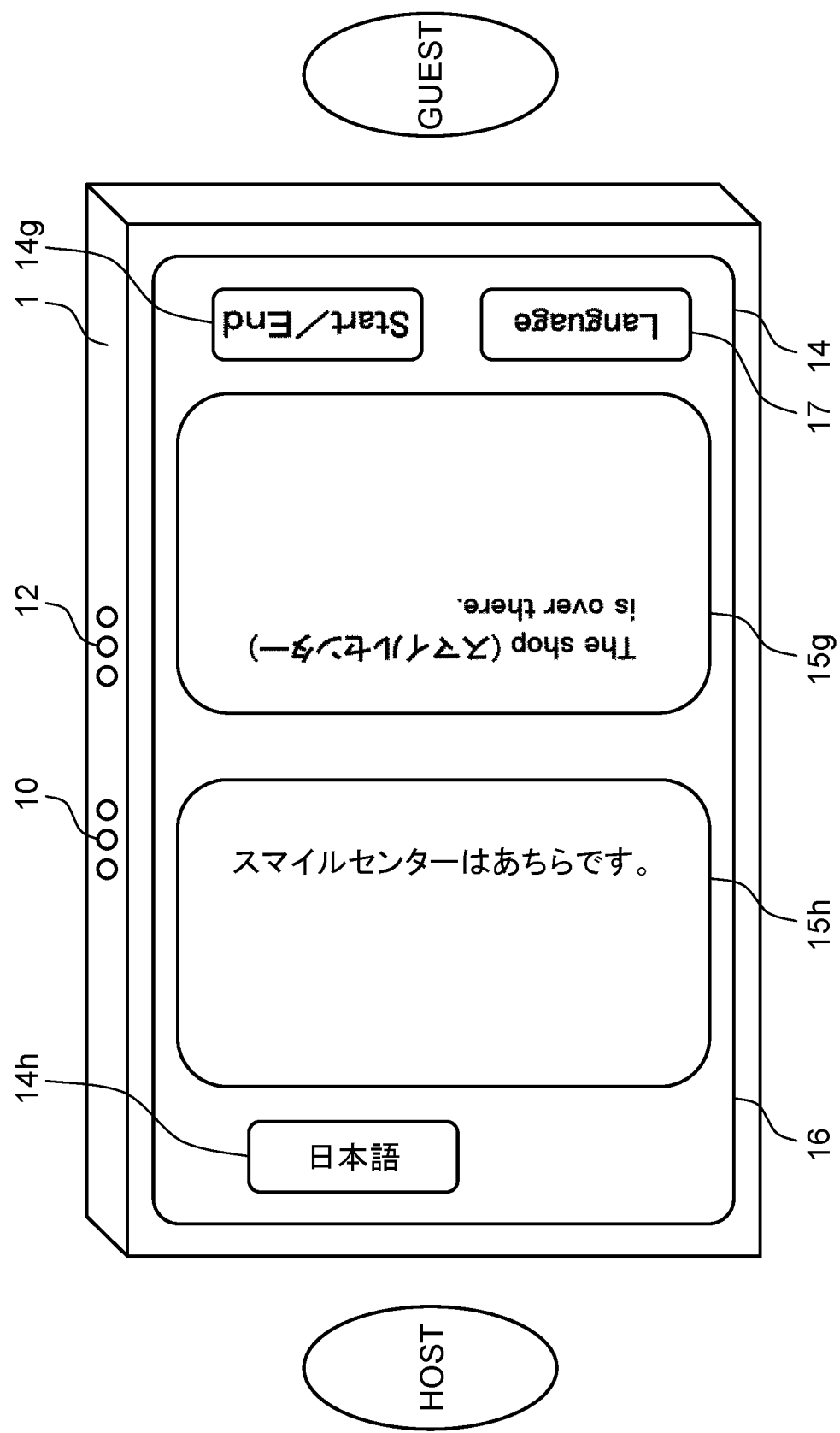
FIG. 1 is a view of an appearance of a translation device according to a first exemplary embodiment.

FIG. 1 is a view of an appearance of a translation device according to a first exemplary embodiment. Translation device 1 illustrated in FIG. 1, which is a tablet type of a translation device, for example, translates conversation between two users speaking in different languages. In short, translation device 1 can make translation from a first language (e.g., Japanese) into a second language (e.g., English or Chinese) and also from the second language (e.g., English or Chinese) into the first language (e.g., Japanese). In some exemplary embodiments described below, translation device 1 translates face-to-face conversation between a host (e.g., guide) who speaks Japanese and a guest (e.g., traveler) speaks English or Chinese.

Translation device 1 includes microphone 10, speaker 12, display 14, and touch panel 16. Both microphone 10 and speaker 12 are disposed, for example, near openings on a side surface of translation device 1. Both display 14 and touch panel 16 are disposed on a main surface of translation device 1. Near one end of display 14 in a longitudinal direction (e.g., adjacent to the host) is an area in which both speech icon 14h and display area 15h are disposed. Near the other end of display 14 in the longitudinal direction (e.g., adjacent to the guest) is an area in which voice icon 14g, language selection icon 17, and display area 15g are displayed. A user can perform a touch operation on speech icons 14h, 14g and language selection icon 17.

Speech icon 14h is an operation icon to be operated by the host to specify start and end points of a speech that the host makes in Japanese (first language), namely, that the host inputs into translation device 1. Speech icon 14g is an operation icon to be operated by the guest to specify start and end points of a speech that the guest makes in English or Chinese (second language), namely, that the guest inputs into translation device 1. Language selection icon 17 is an icon used to select which language the guest will speak, namely, into which language the host's speech will be translated. For example, the guest operates language selection icon 17 to select one of English and Chinese. Each of display areas 15h, 15g is an area in which results of voice recognition, translation, and reverse translation, for example, are to be displayed in the form of a character string.

Figure 2:
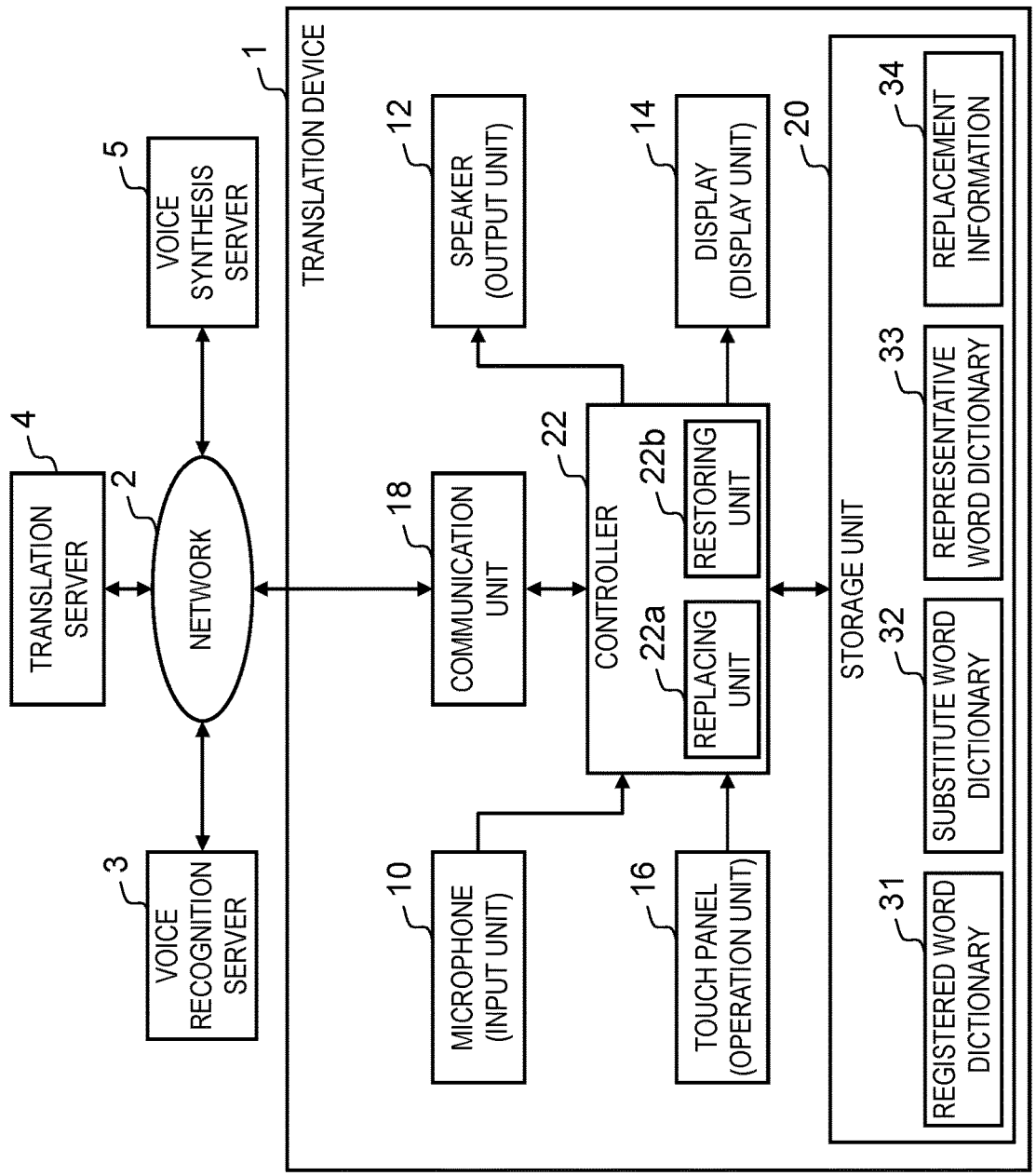
FIG. 2 is a block diagram illustrating an electrical configuration of a translation system according to the first exemplary embodiment.

FIG. 2 is a block diagram illustrating an electrical configuration of a translation system according to the first exemplary embodiment. Translation system 100 of the present disclosure includes translation device 1 illustrated in FIG. 1, voice recognition server 3, translation server 4, and voice synthesis server 5. Translation device 1 individually conducts data communication with voice recognition server 3, translation server 4, and voice synthesis server 5 via network 2 such as the Internet.

Voice recognition server 3 is a server that receives digital voice data from translation device 1 via network 2, then recognizes a voice in the received digital voice data, and generates voice recognition data (text data of a spoken sentence) in the form of a character string. Herein, voice recognition server 3 is an example of a second external device.

Translation server 4 is a server that receives the voice recognition data from translation device 1 via network 2, then translates the received voice recognition data, and generates translation data (text data on a translated sentence) in the form of a character string. Translation server 4 is an example of a first external device that has a function of making translation from Japanese (first language) into English or Chinese (second language) and also from English or Chinese into Japanese.

Voice synthesis server 5 is a server that receives the translation data in the form of a character string from translation device 1 via network 2, then synthesizes voices of the received translation data in the form of a character string, and generates a voice signal.

Translation device 1 includes microphone 10, speaker 12, display 14, touch panel 16, communication unit 18, storage unit 20, and controller 22, Microphone 10 is a device that converts voice sound into digital voice data. More specifically, microphone 10 converts voice sound into a voice signal (analog electrical signal) and further converts the voice signal into digital voice data with an analog-digital (AD) converter. Microphone 10 is an example of an input unit via which a speech (voice) or a spoken sentence (text) is to be input into translation device 1.

Communication unit 18 is a communication module that conducts data communication with voice recognition server 3, translation server 4, and voice synthesis server 5 via network 2 in conformity with a communication scheme, such as Bluetooth (registered trademark), wireless Fidelity (Wi-Fi) (registered trademark), third-generation (3G), long term evolution (LTE) (registered trademark), or the institute of electrical and electronics engineers (IEEE) 802.11.

Storage unit 20 is a recording medium formed of one or a combination of a flash memory, a ferroelectric memory, a hard disk drive (HDD), a solid state drive (SSD), and a random access memory (RAM), for example. Storage unit 20 stores the digital voice data from microphone 10, the voice recognition data, and translation data. Storage unit 20 also stores various program to be executed by controller 22.

In this exemplary embodiment, storage unit 20 stores registered word dictionary 31, substitute word dictionary 32, representative word dictionary 33, and replacement information 34. Registered word dictionary 31 is information that contains specific terms (registered terms) to be replaced. Substitute word dictionary 32 is information that contains terms (substitute terms) to be used instead of the registered terms when translation is made. Representative word dictionary 33 is information that contains terms (representative terms) to be used instead of translations of the registered terms when a translated sentence is displayed. Replacement information 34 is information that indicates a relationship between terms to be used before the replacement and terms to be used after the replacement.

Controller 22 includes replacing unit 22a and restoring unit 22b. Replacing unit 22a replaces a registered term contained in text data (voice recognition data) on a spoken sentence with a substitute term. Restoring unit 22b replaces a substitute translated term that is a translation of the substitute term in text data (translation data) on a translated sentence with a registered translated term that is a translation of the registered term. Controller 22, which may be formed of a central processing unit (CPU) or a micro processing unit (MPU), for example, executes various program stored in storage unit 20 to control an overall operation of translation device 1. In this exemplary embodiment, the function of controller 22 is implemented with cooperation of hardware and software. Alternatively, the function of controller 22 may be implemented only with a hardware circuit dedicatedly designed to realize a predetermined function. In short, controller 22 may be formed of one of the CPU and the MPU or one of a digital signal processor (DSP), a field-programmable gate array (FPGA), and an application specific integrated circuit (ASIC), for example.

Speaker 12 is a device that converts an electrical signal to voice sound. Speaker 12 outputs the voice sound, based on a voice signal (electrical signal) transmitted from controller 22. Speaker 12 is an example of an output unit that outputs voice sound or text indicating a translation result.

Display 14, which may be a liquid crystal or organic electroluminescence (EL) display device, is a device that displays an image. Display 14 displays an image indicated by the voice recognition data, the translation data, or the reverse translation data from controller 22, within each of display areas 15h, 15g. Display 14 is an example of a display unit that displays the voice recognition data, the translation data, and the reverse translation data toward the host and the guest. Display 14 also displays speech icons 14h, 14g and language selection icon 17 described above.

Touch panel 16, which is an operation unit to be operated by the user, receives a user's command. Touch panel 16 is disposed and stacked on display 14.

[1-2. Summary of Replacement Process]

Translation system 100 in this exemplary embodiment has a function of temporarily replacing one or more terms in a spoken sentence with other terms (substitute terms) and then translating the replaced spoken sentence. Herein, the process in which one or more terms in the spoken sentence are temporarily replaced with other terms (substitute terms) before the translation is referred to as the "replacement process". In general, in order to provide accurate machine translation from the first language into the second language, it is necessary to teach extremely many terms to a translation engine in translation server 4. However, it may be difficult to teach so many terms in the translation engine within a short period of time by registering those terms. In addition, if non-generic (specific) terms are taught to the translation engine, those specific terms may affect translation of other generic terms. As a result, the translation engine might fail to translate such generic terms correctly. For this reason, translation system 100 of the present disclosure performs the replacement process on specific terms, and outputs a translation result of an entire spoken sentence without the translation engine translating such specific terms. More specifically, if a spoken sentence contains a specific term, translation system 100 of the present disclosure replaces this specific term with a generic term (substitute term) to generate a processed sentence, and then translates the processed sentence. Following this, translation system 100 performs a restoring process of replacing a translation of the generic term (substitute term) contained in a translation of the processed sentence with a translation of the specific term.

Figures 3, 4:
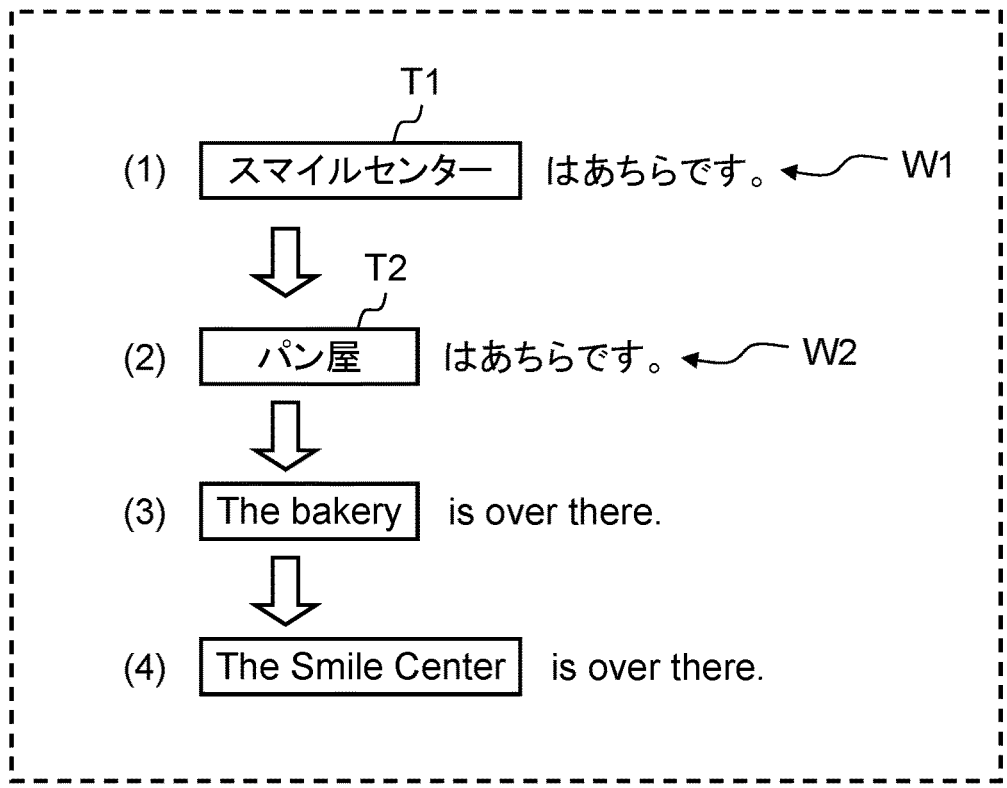
FIG. 3 is an explanatory diagram of a replacement process.
FIG. 4 is a diagram of an example of a registration screen.

FIG. 3 illustrates a flow example of the replacement process described above. In the example of FIG. 3, term T1 meaning "smile center" in Japanese corresponds to a specific term, and term T2 meaning "bakery" in Japanese is a generic term (substitute term) to be used instead of term T1. Japanese term T1 and its English translation "smile center" are both stored in translation device 1 in advance. First, when a speaker speaks sentence W1 meaning "the smile center is over there" in Japanese (see FIG. 3(1)) as an original sentence, term T1 designated as the specific term is replaced with term T2 designated as the substitute term. Then, text data (voice recognition data) on sentence W2 meaning "the bakery is over there" in Japanese is generated as a processed sentence (see FIG. 3(2)). This text data on the processed sentence is translated by the translation engine in translation server 4 into text data (translation data or a provisional translation that is a translation of the processed sentence) "the bakery is over there" (see FIG. 3(3)) in English. Finally, the "bakery" in English is replaced with "smile center" in English that is a translation of term T1 that has been replaced with the substitute term (term T2), and "The Smile Center is over there." in English is output as a translated sentence of the original sentence (see FIG. 3(4)). By the replacement process, as described above, term T1 is not translated by the translation engine, and a translation of original sentence W1, which is a spoken sentence, is output.

To make translation with the replacement process as illustrated in FIG. 3, it is necessary to register specific terms (registered terms) in advance. FIG. 4 illustrates an example of a screen through which such specific terms are to be registered. The registered terms refer to non-generic terms, examples of which include: technical terms used only in any specific fields; and terms used only in certain places or regions. The registered terms include: terms that the host expects to draw guest's interest; and terms that the translation engine may have difficulty translating accurately with machine translation. For example, registration screen 40 as illustrated in FIG. 4 is displayed in display 14 of translation device 1. Through registration screen 40, specific terms (Japanese terms in this case) can be registered together with English and Chinese translations. The registered terms include words and phrases. Herein, of terms expressed in a plurality of languages, terms expressed in a speaker's (host's) language are referred to as "registered terms", whereas terms expressed in languages (guest's language) used for translation are referred to as "the registered translated terms". If English and Chinese translations of the specific term are unknown, their translation columns may be left blank, and a check box "unknown" may be selected. In this way, the specific term can be registered. In addition, a genre (type) of the registered term can be selected from a top-down list, for example. The genre used to classify the term refers to a category of an object indicated by the term. Examples of the genre include a shop and a food. In some cases, genres (types) of registered terms can be classified into the same category. Examples of such genres include foods (Japanese cuisine), foods (western cuisine), foods (Chinese cuisine), and foods (French cuisine). Information regarding those genres may be preset and changed depending on a place where a terminal is used or a usage scene.

When a specific term and its English and Chinese translations are input or when the unknown check box and the genre are selected, registration button 41 becomes enabled. In short, if the unknown check box is selected, it is possible to register a specific term only by inputting the specific term and selecting its genre. In this case, it is unnecessary to input the English and Chinese translations.

When registration screen 40 is displayed in display 14 of translation device 1, a specific term and its translations are registered through touch panel 16 or an input unit (microphone 10 or a keyboard). After the registration, the registered term and the translations are added to registered word dictionary 31. Alternatively, the specific term and the translations may be input by a device independent of translation device 1 via registration screen 40. In this case, translation device 1 may receive information on the specific term and the translations that have been input by the independent device, for example, via communication unit 18.

Figure 5:
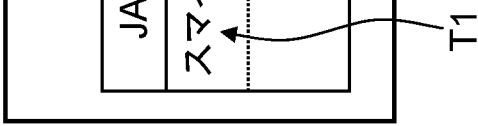
FIG. 5 is a diagram of an example of a registered word dictionary.

FIG. 5 illustrates an example of registered word dictionary 31. Registered word dictionary 31 contains terms and their translations that are expressed in a plurality of languages (Japanese, English, and Chinese) and classes indicating types (genres) of the terms. The terms and translations expressed in the plurality of languages (Japanese, English, and Chinese) and the classes in registered word dictionary 31 are related, respectively, to the registered terms (Japanese), the (English and Chinese) translations, and genres that have been input through registration screen 40 as illustrated in FIG. 4.

FIG. 6 illustrates an example of substitute word dictionary 32. Substitute word dictionary 32 contains terms to be used instead of the registered terms when the translation is made. The terms contained in substitute word dictionary 32 are generic terms that can be translated accurately by the translation engine. The terms contained in substitute word dictionary 32 include words and phrases. Languages (Japanese, English, and Chinese in this exemplary embodiment) of the terms contained in substitute word dictionary 32 are the same as the languages used in registered word dictionary 31. Herein, of the terms expressed in the plurality of languages in substitute word dictionary 32, terms expressed in a host's language are referred to as "substitute terms", whereas terms expressed in languages used for the translation are referred to as "substitute translated terms". Substitute word dictionary 32 contains one or more substitute terms and corresponding substitute translated terms for each class.

FIG. 7 illustrates an example of representative word dictionary 33. Representative word dictionary 33 contains terms (representative terms) to be used instead of translations of the registered terms when a translated sentence is displayed. The representative terms are generic terms from which the classes can be identified. The representative terms may be words or phrases. For example, the representative terms are translations of names of the classes. Languages of the terms contained in representative word dictionary 33 are the same as the languages used for the translations (English and Chinese in this exemplary embodiment) in the registered terms. Representative word dictionary 33 contains one representative term for each class.

When a new registered term is added to registered word dictionary 31, a new class, a new substitute term, and a new representative term may be registered.

FIG. 8 illustrates an example of replacement information 34. In replacement information 34, terms used before the replacement (registered terms) are related to terms used after the replacement (substitute terms). When term T1 is replaced with term T2, if terms T1 and T2 belong to the same class, term T1 is recorded as the term before the replacement, and term T2 is recorded as the term after the replacement.

[1-3. Operation]
[1-3-1. Overall Operation]

With reference to FIGS. 9 to 11B, a description will be given of an operation performed by translation system 100 configured above. In this exemplary embodiment, the translation engine is installed in translation server 4. Translation device 1 transmits text data (voice recognition data in the form of a character string) on a spoken sentence to translation server 4. Then, translation device 1 acquires text data (translation data in the form of a character string) on the translated sentence that indicates a translation result from translation server 4.

Figure 9:
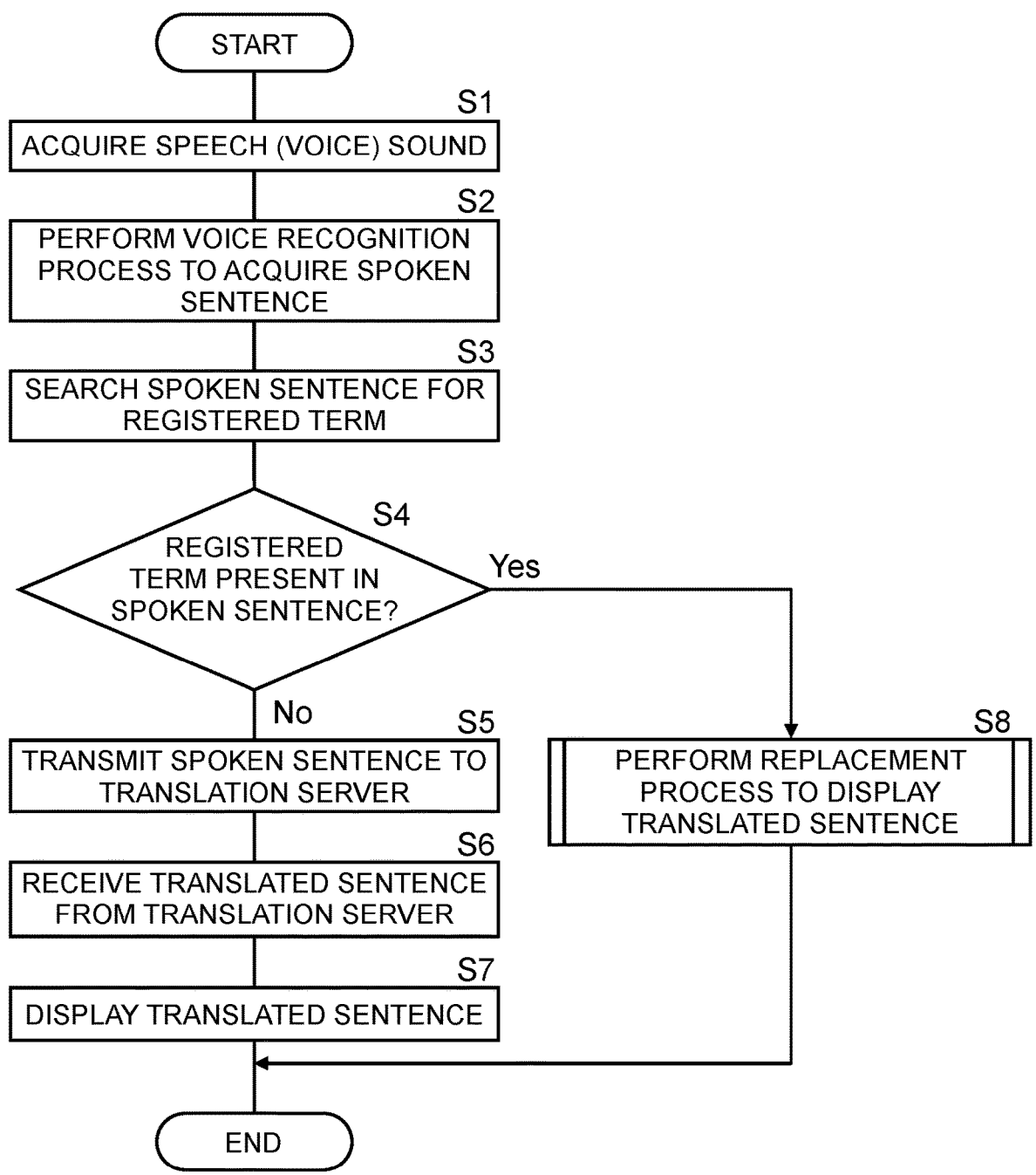
FIG. 9 is a flowchart of a translation process performed by a controller in the translation device according to the first exemplary embodiment.

FIG. 9 is a flowchart of an operation performed by controller 22 in translation device 1. Controller 22 in translation device 1 acquires digital voice data according to a speech (voice sound) made by a speaker through microphone 10 (S1).

Controller 22 acquires a spoken sentence generated from the speech through a voice recognition process (S2). More specifically, controller 22 transmits the digital voice data to voice recognition server 3 via network 2. Voice recognition server 3 recognizes a voice in the received digital voice data to generate text data on the spoken sentence. Translation device 1 receives the text data on the spoken sentence from voice recognition server 3 via network 2. Controller 22 searches the spoken sentence for a registered term contained in registered word dictionary 31 (S3). Controller 22 determines whether a registered term is present in the spoken sentence (S4).

When no registered term is present in the spoken sentence (No at S4), controller 22 performs a regular process to generate and display a translated sentence (S5 to S7). In short, controller 22 translates the spoken sentence without replacing words in the spoken sentence. More specifically, controller 22 in translation device 1 transmits the text data on the spoken sentence to translation server 4 via network 2 (S5). Translation server 4 translates the spoken sentence to generate text data on the translated sentence. Translation server 4 transmits the text data on the translated sentence to translation device 1 via network 2. Translation device 1 receives the text data on the translated sentence from translation server 4 via network 2 (S6). Controller 22 causes display 14 to display the spoken sentence within display area 15h (adjacent to the host) and the translated sentence as the translation result within display area 15g (adjacent to the guest) (S7).

When a registered term is present in the spoken sentence (Yes at S4), controller 22 performs a replacement process to generate and display a translated sentence (S8).

Simultaneously with the displaying of the translated sentence, controller 22 may output voice sound of the translated sentence. In this case, controller 22 transmits the text data of the translated sentences to voice synthesis server 5 via network 2. Based on the text data on the translated sentence received from translation device 1, voice synthesis server 5 performs voice synthesis to generate a voice signal. Then, voice synthesis server 5 transmits the voice signal to translation device 1 via network 2. Controller 22 receives the voice signal from voice synthesis server 5 and then outputs voice sound of the translation result based on the voice signal via speaker 12.

[1-3-2. Translation in Replacement Process]

Figure 10:
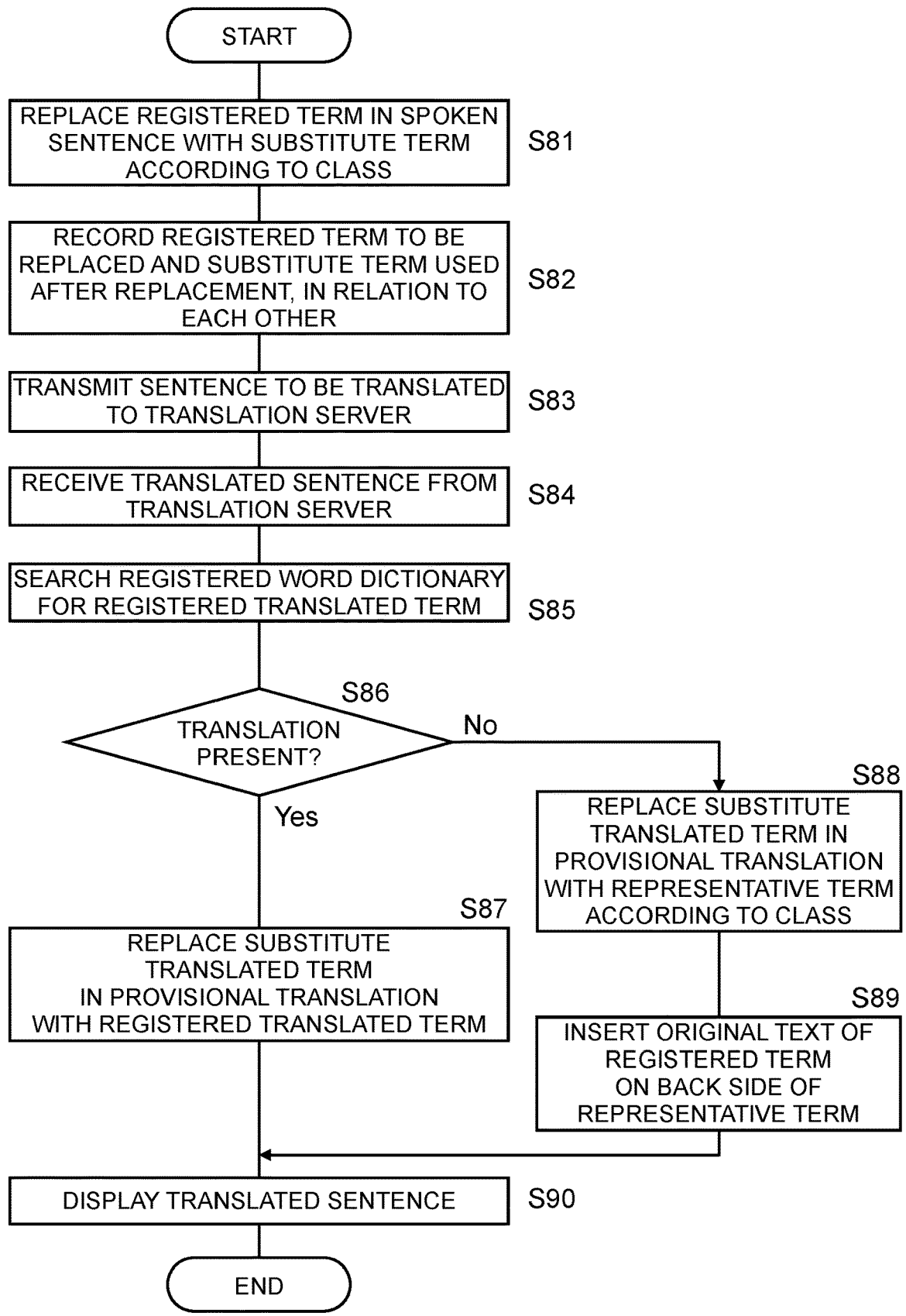
FIG. 10 is a flowchart of steps of generating and displaying a translated sentence in a replacement process according to the first exemplary embodiment.
Figure 11A:
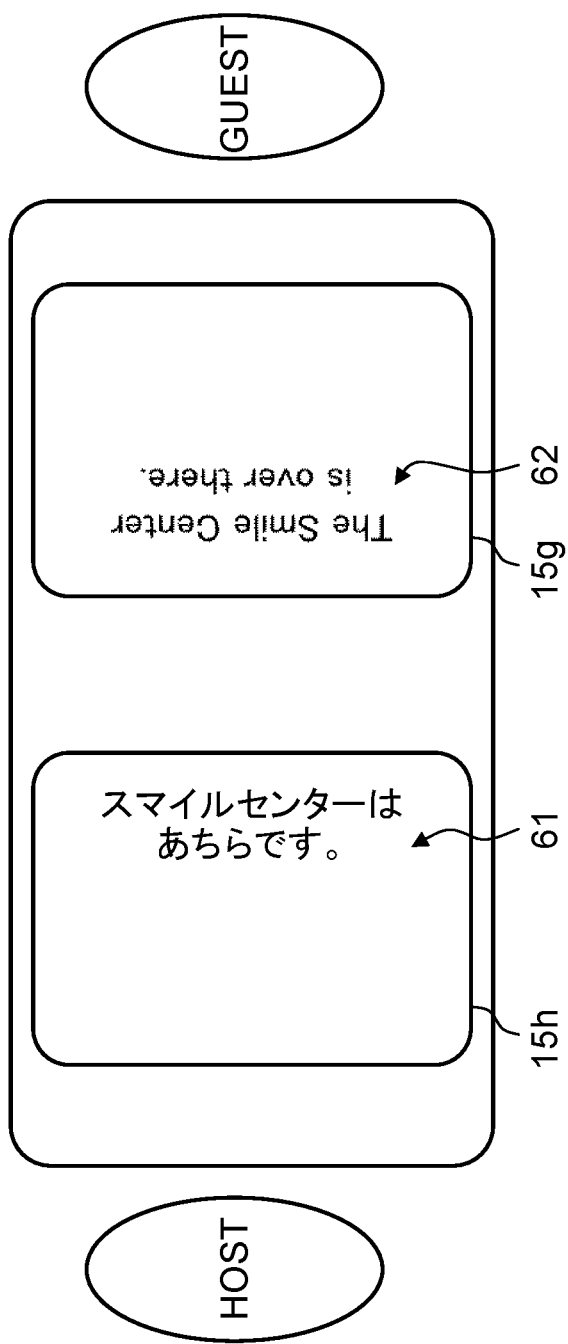
FIG. 11A is a view of a display example of a translation result according to the first exemplary embodiment.
Figure 11B:
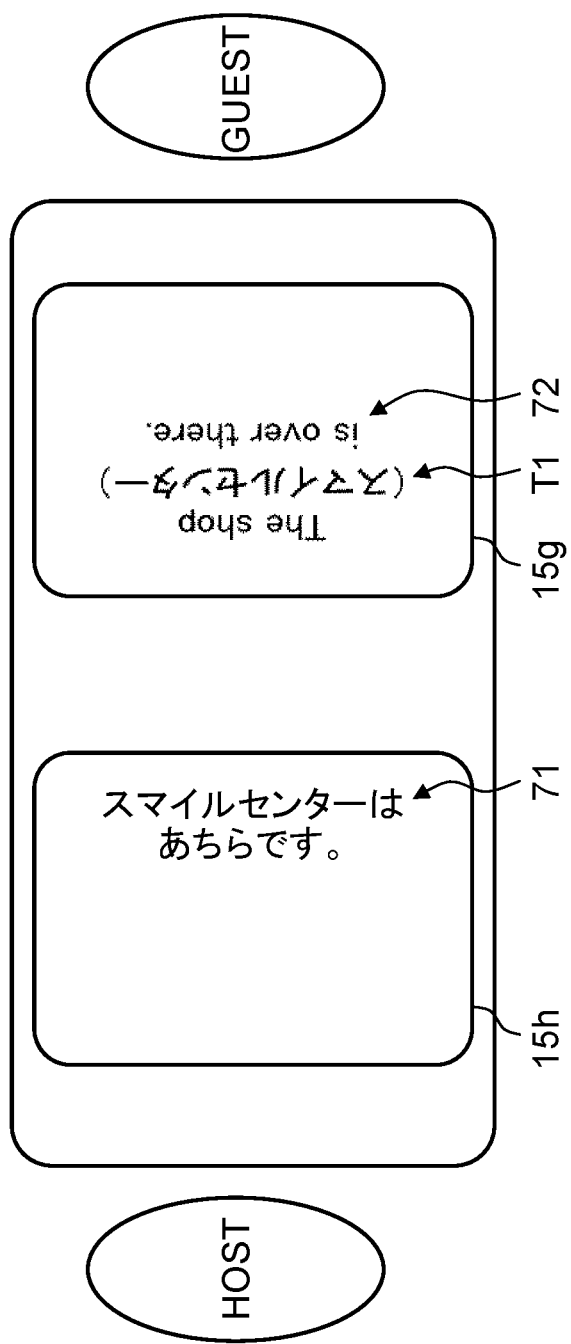
FIG. 11B is a view of another display example of the translation result according to the first exemplary embodiment.

With reference to FIGS. 10, 11A, and 11B, a concrete description will be given of the replacement process (S8) in which a translated sentence is generated and displayed. FIG. 10 illustrates details of the replacement process (S8) in which a translated sentence is generated and displayed when a registered term is present in a spoken sentence (Yes at S4). In the description below, it is expected that the host (guide) makes a speech (voice) in Japanese, and then translation system 100 translates this speech into English and transmits the translation result to the guest (traveler). More specifically, in an example as illustrated in FIG. 3, the host speaks sentence W1 as an original sentence, and English is selected as a translation language.

When a registered term is present in the spoken sentence, as illustrated in FIG. 10, controller 22 in translation device 1 replaces the registered term in the spoken sentence with a substitute term according to the class (S81). As illustrated in FIG. 5, for example, term T1 is registered in registered word dictionary 31 together with the class "shop". As illustrated in FIG. 6, term T2 is registered in substitute word dictionary 32 as a substitute term belonging to the class "shop". Therefore, based on the class "shop", controller 22 selects term T2, as the substitute term, from substitute word dictionary 32. Then, controller 22 replaces term T1 in the spoken sentence, or sentence W1, with term T2 to generate sentence W2, as illustrated in FIG. 3.

Controller 22 relates the registered term to the substitute term used after the replacement, and records the registered and substitute terms as replacement information 34 (S82). As illustrated in FIG. 8, for example, term T1 is recorded in replacement information 34 as the term used before the replacement, and term T2 is recorded in replacement information 33 as the term after the replacement.

Controller 22 transmits text data on a processed sentence generated from the spoken sentence to translation server 4, via network 2 (S83). In this case, controller 22 transmits text data on sentence W2 that contains term T2 as the substitute term. Translation server 4 receives the text data on the processed sentence and then translates the processed sentence to generate text data on a provisional translation that is a translation of the processed sentence. In this case, translation server 4 translates sentence W2 into "The bakery is over there.".

Translation server 4 transmits the text data on the provisional translation to translation device 1 via network 2. Controller 22 in translation device 1 receives the text data on the provisional translation from translation server 4 via network 2 (S84). Controller 22 searches registered word dictionary 31 for a registered translated term which is expressed in a translation language (guest's language) (S85). In this case, controller 22 searches for English related to term T1. Controller 22 determines whether a registered translated term which is expressed in the translation language (guest's language) is present in registered word dictionary 31 (S86).

When a registered translated term which is expressed in the translation language (guest's language) is present in registered word dictionary 31 (Yes at S86), controller 22 replaces the substitute translated term in the provisional sentence with the registered translated term (S87). In this case, controller 22 reads English "smile center" related to term T1 from registered word dictionary 31 and replaces "bakery" in the provisional translation with "smile center". As a result, "The bakery is over there." is replaced with "The Smile Center is over there.". Controller 22 causes display 14 to display the spoken sentence within display area 15*h* (adjacent to the host) and also to display the replaced translated sentence within display area 15*g* (adjacent to the guest) (S90).

When a registered translated term which is expressed in the translation language (guest's language) is absent in registered word dictionary 31 (No at S86), controller 22 replaces the substitute translated term in the provisional translation with a representative term expressed in the translation language (guest's language) according to the class (S88). In this case, controller 22 selects "shop" in representative word dictionary 33 based on the class "shop" and replaces "bakery" in the provisional translation with "shop". Then, controller 22 inserts the original text (term T1 expressed in the host's language) of the registered term, on a back side of the representative term (S89). In this case, for example, the registered term is inserted in parentheses. In short, "bakery" in the provisional translation is replaced with a combination of an English word "shop" and a Japanese word which means "Smile Center" in English. Controller 22 causes display 14 to display the spoken sentence within display area 15*h* (adjacent to the host) and also to display the replaced translated sentence in which the substitute term is replaced with the representative term within display area 15*g* (adjacent to the guest) (S90).

FIG. 11A illustrates a display example given when a translation "smile center" of term T1 used as a registered term is registered in registered word dictionary 31. Spoken sentence 61 is displayed within display area 15*h* adjacent to the host, whereas translated sentence 62 (an example of a first display-purpose translated sentence) is displayed within display area 15*g* adjacent to the guest. In this example, translated sentence 62 contains the registered translated term "smile center", because the registered translated term "smile center" is contained in registered word dictionary 31.

FIG. 11B illustrates a display example given when a translation "smile center" of term T1 used as a registered term is not registered in registered word dictionary 31. Spoken sentence 71 is displayed within display area 15*h* adjacent to the host, whereas translated sentence 72 (an example of a second display-purpose translated sentence) is displayed within display area 15*g* adjacent to the guest. In this example, the translation "smile center" which is expressed in the translation language (English) is not contained in registered word dictionary 31. Therefore, translated sentence 72 contains a representative term "shop" expressed in the translation language (English) and term T1 used as the registered term which is expressed in the host's language (Japanese), on the back side of this representative term "shop".

As described above, even if a registered translated term which is expressed in a translation language is not registered in registered word dictionary 31, translation device 1 in this exemplary embodiment displays a translated sentence. The translated sentence displayed in this case contains a representative term that represents a class which the registered term belongs to and which is expressed in the translation language (guest's language). Thus, a guest can guess an outline of a host's speech by viewing the translated sentence containing the representative term. In this exemplary embodiment, it is possible to register registered terms and genres alone. In other words, it is possible to register registered terms without having to register registered translated terms. Thus, the host can register the registered terms even when not knowing translations of registered terms. Consequently, it is possible to provide improved convenience upon registration.

When displaying a translated sentence in two languages (spoken language and translation language), translation device 1 does not have to output sound of a portion (registered term inserted at a back of a representative term) of the translated sentence which is expressed in a language different from the translation language.

[1-4. Effect and Others]

As described above, translation device 1 according to this exemplary embodiment acquires an original sentence (e.g., spoken sentence) expressed in a first language (e.g., Japanese), and then replaces a target term (e.g., a Japanese word which means "Smile Center" in English) contained in the original sentence with a substitute term (e.g., a Japanese word which means "Bakery" in English) in the first language, thereby generating a processed sentence. The translation device 1 includes storage unit 20, communication unit 18, display 14 (an example of a display unit), and controller 22. Storage unit 20 stores the target term, the substitute term, a substitute translated term (e.g., bakery), and a representative term (e.g., shop). The substitute translated term (e.g., bakery) is a translation of the substitute term and is expressed in a second language (e.g., English). The representative term (e.g., shop) indicates a type of the target term and is expressed in the second language (e.g., English). Communication unit 18 outputs the processed sentence to translation server 4 (an example of a first external device) that has a function of making translation from the first language into the second language. Then, communication unit 18 acquires a provisional translation from translation server 4. The provisional translation is a translation of the processed sentence and expressed in the second language. Controller 22 controls display 14. When storage unit 20 stores a target translated term (e.g., smile center) that is a translation of the target term and is expressed in the second language, controller 22 replaces the substitute translated term (e.g., bakery) in the provisional translation with the target translated term (e.g., smile center) to generate a first display-purpose translated sentence. Then, controller 22 causes display 14 to display the first display-purpose translated sentence. When storage unit 20 does not store the target translated term (e.g., smile center), controller 22 replaces the substitute translated term (e.g., bakery) contained in the provisional translation with a representative term (e.g., shop) to generate a second display-purpose translated sentence. Then, controller 22 causes display 14 to display the second display-purpose translated sentence.

In the above way, translation device 1 can display the representative term, instead of a portion of the translated sentence which corresponds to the registered term. Thus, a host does not necessarily have to register the translation of the registered term. In short, the host can simply register the registered term when not knowing the translation of the registered term. Consequently, it is possible to provide improved convenience upon registration. When there is no translation of the registered term, translation device 1 can display the translated sentence together with the representative term that indicates the type of the registered term. This enables a guest to guess an outline of a host's speech by viewing the translated sentence containing the representative term.

When storage unit 20 does not store the target translated term (e.g., smile center), controller 22 inserts the target term (e.g., term T1) into the second display-purpose translated sentence. This enables the guest to guess an outline of a host's speech more easily by viewing the translated sentence containing the representative term.

Display unit 14 displays a screen for use in inputting the target term (e.g., term T1), the target translated term (e.g., smile center), and the type (e.g., shop) of the target term. When receiving at least the target term and the type of the target term, controller 22 accepts registry and stores the received target term and type of the target term in storage unit 20. Thus, the host can register the registered term even when not knowing the translation of the registered term. Consequently, it is possible to provide improved convenience upon registration.

The type of the registered term is identical to a type of the substitute term. In this case, the displayed translated sentence which is obtained by replacing the substitute translated term contained in the provisional translation with the representative term is still consistent. Consequently, the guest who views the displayed sentence can understand or guess the content of the sentence.

Second Exemplary Embodiment

Some other exemplary embodiments of translation device 1 will be described. In the first exemplary embodiment, when registered word dictionary 31 does not contain a translation of a registered term which is expressed in a translation language (guest's language), controller 22 inserts an original word (expressed in a host's language) of the registered term, at a back side of a representative term (S89). In short, when the host speaks Japanese, controller 22 inserts a registered term expressed in Japanese on the back side of the representative term. However, some guests can more easily understand or guess the content expressed in a language different from the host's language. Translation device 1 in this exemplary embodiment changes a language (translated word) used for the registered term which is inserted at the back side of the representative term, depending on the translation language (guest's language).

FIG. 12 is a diagram of an example of a priority table. Storage unit 20 stores priority table 35. Priority table 35 indicates dependence of a priority order of a language used for a registered term and inserted on a back side of a representative term upon a translation language. A language that a guest can understand easily depends on his or her spoken language (mother language, official language). Among many languages, some are similar to one another. For example, Thai is similar to Laotian. Thus, the priority is determined in advance based on a mother language, official language, and similar languages, for example.

Figure 13:
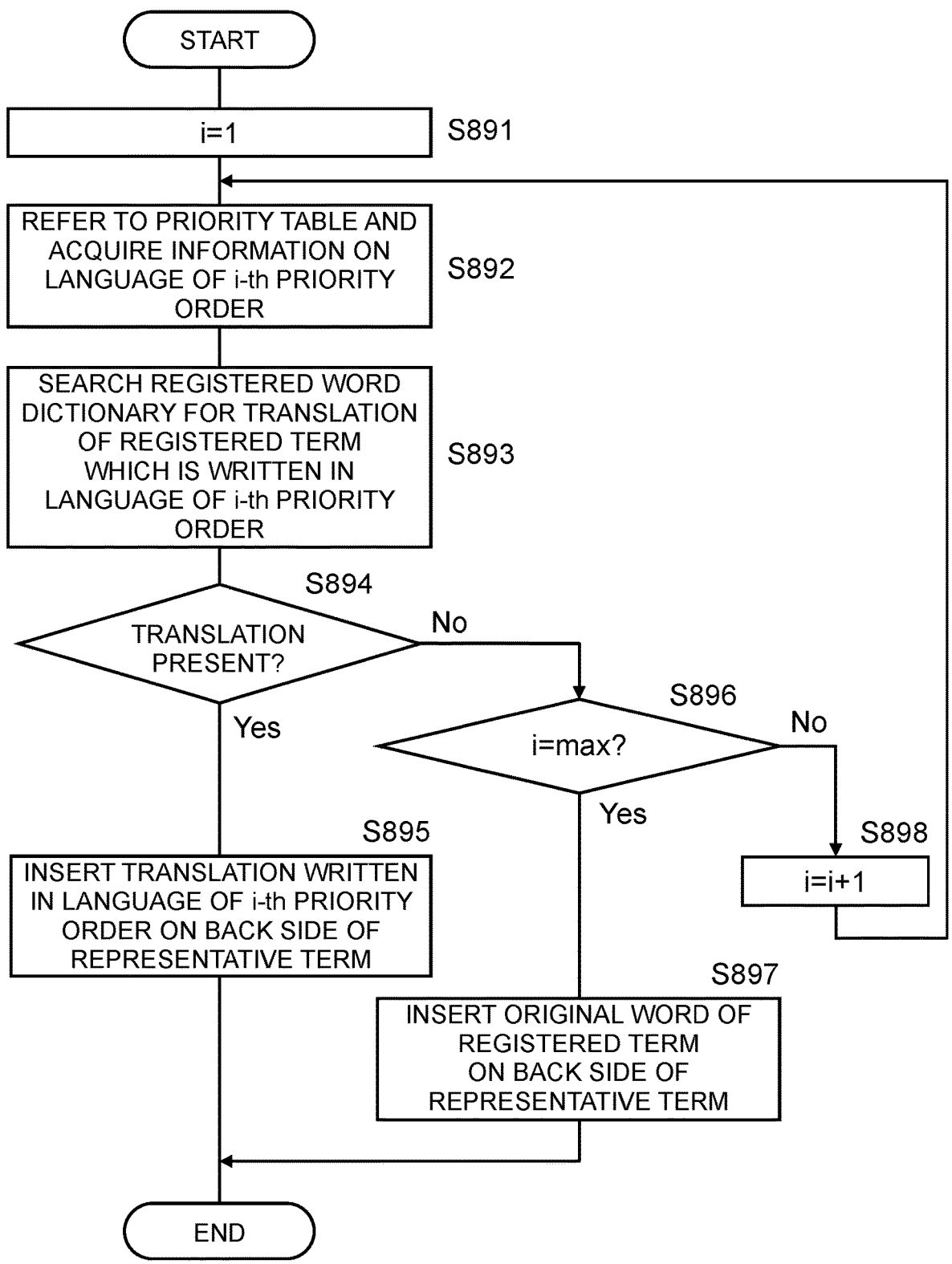
FIG. 13 is a flowchart of a process, according to the second exemplary embodiment, of selecting a term to be inserted at a back of a representative term and inserting the selected term.

FIG. 13 is a flowchart of a process, according to the second exemplary embodiment, of selecting a term to be inserted at a back of a representative term and inserting the selected term. All steps S891 to S898 (a process of selecting a term and inserting the term) in FIG. 13 are performed instead of step S89 (a process of inserting a registered term of an original sentence) in FIG. 10. In this exemplary embodiment described below, translation device 1 translates face-to-face conversation between a host (e.g., guide) who speaks Japanese and a guest (e.g., traveler) speaks Chinese. More specifically, translation device 1 translates a host's speech from Japanese into Chinese and displays the translation result toward the guest.

First, controller 22 in translation device 1 sets variable i that indicates a priority order in priority table 35 to 1 (i=1) (S891). Then, controller 22 refers to priority table 35 and acquires information on a language of an i-th priority order (S892). In this case, since the translation language (guest's language) is Chinese, controller 22 acquires information from priority table 35 which indicates that a language of a priority order "1" is English.

Controller 22 searches registered word dictionary 31 for a translation of the registered term which is expressed in a language of the i-th priority order (S893). When the translation expressed in the language of the i-th priority order is present in registered word dictionary 31 (Yes at S894), controller 22 inserts this translation on a back side of a representative term (S895). For example, when the translation language (guest's language) is Chinese, if a translation expressed in English whose priority is "1" is contained in registered word dictionary 31, controller 22 inserts the translation expressed in English on the back side of the representative term. In this case, the translated sentence is expressed in Chinese but contains some English terms.

If the translation expressed in the language of the i-th priority is absent in registered word dictionary 31 (No at S894), controller 22 determines whether i reaches a maximum value max (S896). In this case, the maximum value max indicates a number of priority orders set in priority table 35. When i does not reach the maximum value max (No at S896), controller 22 adds 1 to i (S898). Controller 22 returns to Step S892 and acquires a next language of i-th priority order. In this way, controller 22 sequentially searches registered word dictionary 31 for a translation expressed in a language of priority order i while decrementing 1.

When i reaches the maximum value max (Yes at S896), namely, when translations expressed in languages of all the priority orders, including maximum and minimum priority orders, are not contained in registered word dictionary 31, controller 22 inserts an original word (i.e., expressed in the host's language) of the registered term on the back side of the representative term (S897).

In this exemplary embodiment, when storage unit 20 does not store a translation, expressed in the second language, of a target term but store translations, expressed in a plurality of languages other than the second language, of the target term, controller 22 selects one of the translations expressed in the plurality of languages in accordance with the second language. Then, storage unit 20 inserts the translation of the target term which is expressed in the selected language into a display-purpose translated sentence. In this case, the displayed translation of the registered term is a language that a person (guest) who views the translated sentence can easily understand. Consequently, the guest can easily understand the content of a host's speech from the displayed sentence.

Other Exemplary Embodiments

The first and second exemplary embodiments have been described above as examples of the technique disclosed in this application. However, the technique of the present disclosure is not limited to those first and second exemplary embodiments, and also applicable to other exemplary embodiments that undergo some modifications, replacements, additions, and omissions, for example, as appropriate. Novel exemplary embodiments may also be contemplated from a combination of some components of the foregoing first and second exemplary embodiments. Some other exemplary embodiments will be described below as examples.

In the foregoing exemplary embodiment, a class (type) of a registered term with a substitute term is identical to a class (type) for use in displaying a representative term. However, a type (translation class) of a target term which is referenced when the target term is replaced with a substitute term may be different from a type (display class) of the target term which is referenced when a substitute translated term is replaced with a representative term. In short, a type of a target term may be different from a type of a substitute term. More specifically, as illustrated in FIG. 14, registered word dictionary 31 may contain a display class and a translation class for each registered term: the display class is used to select a representative term; and the translation class is used to select a substitute term. In this case, a class in substitute word dictionary 32 corresponds to the translation class, whereas a class of representative word dictionary 33 corresponds to a display class. The replacement of a registered term in a spoken sentence with a substitute term is based on the translation class. The replacement of a translation of a substitute term in a translated sentence with a representative term is based on the display class. Registration screen 40 may allow both display and translation classes to be registered. In a default state, the translation class may identical to the display class. The translation class may be changed automatically in accordance with a translation feedback from a user and a translation score checked by a system. In this case, for example, the translation score may be estimated by determining, comparing, and evaluating distances between an original sentence and its re-translated sentence with a representative term in a current class and with a representative term in another class.

In the foregoing first and second exemplary embodiments, representative word dictionary 33 contains one representative term for each class. However, representative word dictionary 33 may contain a plurality of representative terms for each class. In this case, representative word dictionary 33 may contain a plurality of representative terms and their priority orders for each class. Each priority order may be preset in accordance with a terminal user, a business category, or a business field, for example. Then, a representative term for use in replacing a substitute translated term (S88) may be selected based on a priority order.

In the foregoing first exemplary embodiment, controller 22 inserts a registered term at a back side of a representative term (S89). However, controller 22 may insert a registered term at a front side of a representative term. Likewise, in the foregoing second exemplary embodiment, controller 22 may insert a translation, based on a priority order, of a registered term to be replaced at a front side of a representative term.

In the foregoing first and second exemplary embodiments, when displaying a translated sentence containing a representative term within display area 15*g* (adjacent to the guest) (S90), display 14 may also display, for example, a balloon or an icon near the representative term, and this balloon or icon may contain a message that the representative term is roughly translated.

In the above exemplary embodiments, voice recognition server 3 performs the voice recognition, translation server 4 performs the translation, and voice synthesis server 5 performs the voice synthesis. However, the present disclosure is not limited to this configuration. Alternatively, translation device 1 may perform at least one of the voice recognition, the translation, and the voice synthesis. For example, translation device 1 (terminal) may perform functions the same as in voice recognition server 3, translation server 4, and voice synthesis server 5. Translation device 1 may solely perform all processes related to the translation. In this case, translation device 1 does not necessarily have to include communication unit 18.

In the foregoing exemplary embodiments, the translation is made between Japanese and English or between Japanese and Chinese, as an example. However, translation languages are not limited to Japanese, English, and Chinese. Alternatively, the translation languages may be other languages (e.g., German, French, Spanish, Korean, Thai, Vietnamese, and Indonesian).

In the foregoing exemplary embodiments, translation device 1 translates spoken sentences received via microphone 10, but may translate input sentences other than spoken sentences. More specifically, translation device 1 may translate input sentences received via a keyboard or a mouse. When translating a sentence such as a spoken sentence or an input sentence, translation device 1 of the present disclosure replaces a target term in the sentence with a substitute term. Then, translation device 1 replaces a substitute translated term in the provisional translation with a target translated term which has been replaced with the substitute term. After that, translation device 1 displays the translated sentence with a translation of the term to be replaced highlighted.

In the foregoing exemplary embodiments, translation device 1 causes display 14 to output display of a first display-purpose translated sentence and a second display-purpose translated sentence through. However, translation device 1 may output sound of the first and second display-purpose translated sentences through speaker 12. In this way, a person can understand letters expressed in a language that he or she cannot understand, by means of sound.

As described above, the exemplary embodiments have been described as examples of the technique in the present disclosure. For that purpose, the accompanying drawings and the detailed description have been provided.

To illustrate the above technique, the components described in the accompanying drawings and the detailed description can include not only components necessary to solve the problem but also components unnecessary to solve the problem. For this reason, it should not be promptly recognized that those unnecessary components are necessary just because those unnecessary components are described in the accompanying drawings and the detailed description.

Since the above exemplary embodiment is intended to illustrate the technique in the present disclosure, various modifications, replacements, additions, and removals, for example, can be made without departing from the scope of the accompanying claims or the equivalent thereof.

INDUSTRIAL APPLICABILITY

The present disclosure is applicable to translation devices that make translation, based on speaker's voices.

REFERENCE MARKS IN THE DRAWINGS

1: translation device
2: network
3: voice recognition server
4: translation server (first external device)
5: voice synthesis server
10: microphone (input unit)
12: speaker (output unit)
14: display (display unit)
14h, 14g: speech icon
15h, 15g: display area
16: touch panel (operation unit)
17: language selection icon
18: communication unit
20: storage unit
22: controller
22a: replacing unit
22b: restoring unit
31: registered word dictionary
32: substitute word dictionary
33: representative word dictionary
34: replacement information
100: translation system

The invention claimed is:

1. A translation device that acquires an original sentence expressed in a first language, and replaces a target term contained in the original sentence with a substitute term in the first language to generate a processed sentence, the translation device comprising:
a storage unit that stores the target term, the substitute term, a substitute translated term, and a representative term, the substitute translated term being a translation of the substitute term and being expressed in a second language, the representative term being a generic term indicating a type of the target term and being expressed in the second language;
a communication unit that outputs the processed sentence to a first external device and acquires a provisional translation from the first external device, the provisional translation being a translation of the processed sentence and expressed in the second language, the first external device having a function of making translation from the first language into the second language;
a display unit; and
a controller that controls the display unit, wherein:
when the storage unit stores a target translated term that is a translation of the target term and is expressed in the second language, the controller replaces the substitute translated term contained in the provisional translation with the target translated term to generate a first display-purpose translated sentence, and then causes the display unit to display the first display-purpose translated sentence, and
when the storage unit does not store the target translated term, the controller generates a second display-purpose translated sentence by replacing the substitute translated term contained in the provisional translation with the representative term and inserts the target term into the second display-purpose translated sentence, and then causes the display unit to display the second display-purpose translated sentence including the target term.

2. The translation device according to claim 1, wherein the display unit displays an image that allows input of the target term, the target translated term, and the type of the target term, and
when receiving at least the target term and the type of the target term, the controller stores the received target term and type of the target term in the storage unit.

3. The translation device according to claim 1, wherein when the storage unit does not store the target translated term but stores a plurality of translations of the target term expressed in respective languages different from the second language,
the controller selects one of the plurality of languages in accordance with the second language and then inserts one of the translations of the target term expressed in the selected language into the second display-purpose translated sentence.

4. The translation device according to claim 1, wherein the storage unit stores a type of the substitute term, and the type of the target term is identical to the type of the substitute term.

5. The translation device according to claim 1, wherein the storage unit stores a type of the substitute term, and the type of the target term is different from the type of the substitute term.

6. The translation device according to claim 1, further comprising an input unit that acquires a speech, wherein the communication unit outputs voice data of the speech to a second external device and acquires the original sentence in accordance with the voice data from the second external device.

7. The translation device according to claim 1, wherein the controller inserts the target term after the representative term and before a next word to the representative term in the second display-purpose translated sentence.

8. A translation device that acquires an original sentence expressed in a first language, and replaces a target term contained in the original sentence with a substitute term in the first language to generate a processed sentence, the translation device comprising:
a storage unit that stores the target term, the substitute term, a substitute translated term, and a representative term, the substitute translated term being a translation of the substitute term and being expressed in a second language, the representative term being a generic term indicating a type of the target term and being expressed in the second language;
a communication unit that outputs the processed sentence to a first external device and acquires a provisional translation from the first external device, the provisional translation being a translation of the processed sentence and expressed in the second language, the first external device having a function of making translation from the first language into the second language;

an output unit; and a controller that controls the output unit, wherein:

when the storage unit stores a target translated term that is a translation of the target term and is expressed in the second language, the controller replaces the substitute translated term contained in the provisional translation with the target translated term to generate a first output-purpose translated sentence, and then causes the output unit to output sound of the first output-purpose translated sentence, and when the storage unit does not store the target translated term, the controller generates a second output-purpose translated sentence by replacing the substitute translated term contained in the provisional translation with the representative term and inserts the target term into the second output-purpose translated sentence, and then causes the output unit to output sound of the second output-purpose translated sentence.

9. The translation device according to claim 8, wherein the controller inserts the target term after the representative term and before a next word to the representative term in the second output-purpose translated sentence.

* * * * *